United States Patent
Subrahmanyan

(10) Patent No.: US 6,999,909 B1
(45) Date of Patent: Feb. 14, 2006

(54) PROCESS FOR DESIGNING AN OPTIMAL VIBRATION ISOLATION MOUNT FOR A DISC DRIVE

(75) Inventor: Pradeep Kumar Subrahmanyan, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1001 days.

(21) Appl. No.: 09/651,046

(22) Filed: Aug. 30, 2000

Related U.S. Application Data

(60) Provisional application No. 60/162,269, filed on Oct. 28, 1999.

(51) Int. Cl.
  *G06F 17/10* (2006.01)
  *G11B 5/596* (2006.01)

(52) U.S. Cl. .................. 703/2; 360/78.09
(58) Field of Classification Search ............ 703/2; 360/78.09, 68.09
  See application file for complete search history.

(56) References Cited

U.S. PATENT DOCUMENTS

| | | | |
|---|---|---|---|
| 4,099,211 A | 7/1978 | Hathaway | 360/109 |
| 4,638,383 A | 1/1987 | McGinlay et al. | 360/77 |
| 4,642,715 A | 2/1987 | Ende | 360/97 |
| 4,705,257 A | 11/1987 | Leo et al. | 248/611 |
| 4,749,164 A | 6/1988 | Leo et al. | 248/674 |
| 4,757,406 A | 7/1988 | Stewart et al. | 360/51 |
| 4,833,554 A | 5/1989 | Dalziel et al. | 360/98.04 |
| 4,890,174 A | 12/1989 | Chalmers et al. | 360/78.12 |
| 4,893,210 A | 1/1990 | Mintzlaff | 360/137 |
| 4,937,806 A | 6/1990 | Babson et al. | 369/75.1 |
| 4,980,786 A | 12/1990 | O'Sullivan et al. | 360/97.03 |
| 5,016,185 A | 5/1991 | Kuester et al. | 364/481 |
| 5,124,855 A | 6/1992 | Dew et al. | 360/97.02 |
| 5,149,048 A | 9/1992 | Morehouse et al. | 248/632 |
| 5,163,038 A | 11/1992 | Arai | 369/77.2 |
| 5,294,085 A | 3/1994 | Lloyd et al. | 248/562 |
| 5,325,026 A | 6/1994 | Lyons et al. | 318/254 |
| 5,400,196 A | 3/1995 | Moser et al. | 360/97.02 |

(Continued)

FOREIGN PATENT DOCUMENTS

EP  0 567 833 A2  11/1993

(Continued)

OTHER PUBLICATIONS

Kim; Optimal vibration control of distributed parameter rotor bearing system by using electromagnetic bearing; PhD dissertation abstract; pp. 1-2; Aug. 1989.*

*Primary Examiner*—Hugh Jones
(74) *Attorney, Agent, or Firm*—Westman, Champlin & Kelly, P.A.

(57) ABSTRACT

An optimal vibration mount for a disc drive is designed by computing external, $\Xi$, and internal, $\Theta$, disturbance models for the disc drive and defining an inertia matrix, M, for the disc drive. A state estimator, such as a Kalman filter, is defined based on the inertia matrix and external and internal disturbance models, and a covariance matrix, $\Sigma$, is derived based on the filter algebraic Riccati equation. The state estimator gain, H, is calculated from $\Sigma(I\ 0)'\Theta^{-1}$, and the optimal mount damping, B. and stiffness, K, parameters are derived from the state estimator gain and inertia matrix, $$H = \begin{pmatrix} M^{-1} & B \\ M^{-1} & K \end{pmatrix}.$$

8 Claims, 5 Drawing Sheets

U.S. PATENT DOCUMENTS

| | | | |
|---|---|---|---|
| 5,416,658 A | 5/1995 | Sega et al. | 360/106 |
| 5,463,527 A | 10/1995 | Hager et al. | 361/685 |
| 5,483,398 A | 1/1996 | Boutaghou | 360/97.02 |
| 5,539,595 A | 7/1996 | Beck et al. | 360/97.01 |
| 5,552,209 A | 9/1996 | McCutcheon | 428/209 |
| 5,587,854 A | 12/1996 | Sato et al. | 360/97.01 |
| 5,666,242 A | 9/1997 | Edwards et al. | 360/106 |
| 5,668,680 A | 9/1997 | Tremaine | 360/78.07 |
| 5,721,648 A | 2/1998 | Phan et al. | 360/78.09 |
| 5,748,578 A | 5/1998 | Schell | 369/44.14 |
| 5,761,184 A | 6/1998 | Dauber et al. | 369/247 |
| 5,875,067 A | 2/1999 | Morris et al. | 360/97.01 |
| 6,029,959 A | 2/2000 | Gran et al. | 267/136 |
| 6,077,302 A | 6/2000 | Kumra et al. | 703/7 |

FOREIGN PATENT DOCUMENTS

| | | |
|---|---|---|
| WO | WO 99/08267 | 2/1999 |
| WO | WO 00/41042 | 7/2000 |

\* cited by examiner

PROCESS FOR DESIGNING AN OPTIMAL VIBRATION ISOLATION MOUNT FOR A DISC DRIVE

CROSS-REFERENCE TO RELATED APPLICATION

This application claims benefit of U.S. Provisional Patent Application No. 60/162,269 filed Oct. 28, 1999 by Pradeep K. Subrahmanyan for "Optimal Vibration Isolation Mount Design".

FIELD OF THE INVENTION

This invention is directed to disc drives for storing information, and particularly to a process of identifying characteristics of optimal passive damping mounts for a disc drive to minimize the effects of disturbances. The invention is also applicable to identifying the mount parameters for servo track writers to minimize written-in-runout.

BACKGROUND OF THE INVENTION

There are two types of disturbances that affect operation of disc drives, internal disturbances and external disturbances. Examples of internal disturbances include windage encountered by the head/arm assembly due to the rotating disc, noise in the position error signal (PES), structural resonance of the disc drive, motion of the actuator assembly (including the voice coil motor, actuator arm and suspension), imbalance of the disc pack assembly (including the disc pack, spindle and drive motor), written-in runout in the servo patterns due to disturbances during writing of the servo patterns, unmodeled dynamics and non-linearities such as pivot bearing friction, to name a few. External disturbances include environmental (seismic) vibration and external reactions to internal disturbances. Moreover, environmental vibrations during servo writing adversely affect the servo pattern placement, causing written-in runout in the servo patterns written to the disc.

When a disc drive is subjected to disturbances, the radial position of the read/write head in respect to the confronting disc may be affected. Consequently, such disturbances adversely affect head/disc tracking. For this reason, the heads and the data tracks on the disc have some defined width that is large enough to assure that expected motion due to disturbances does not materially affect the performance of the disc drive. Consequently, the effect of disturbances is a limiting factor on the maximum areal data density of the disc drive. While passive damping mounts are used to attenuate these disturbances, they have not been altogether successful due to inadequate compromises in meeting the competing requirements of internal and external disturbance attenuation.

The present invention addresses these and other problems, and offers other advantages over the prior art by providing a process for identifying optimal damping characteristics of a passive damping mount for a disc drive to minimize adverse affects of internal and external disturbances.

SUMMARY OF THE INVENTION

The present invention is directed to a process of designing an optimal vibration mount for a disc drive. The internal and external disturbance models are calculated for the disc drive, and the inertia matrix for the disc drive is defined. A state estimator is defined based on the inertia matrix and external and internal disturbance models, the state estimator minimizing a defined norm, such as the 2-norm, of the state estimation error. The gain of the state estimator is calculated as a solution to the filter algebraic Riccati equation, and the optimal mount and damping parameters are derived based on the calculated state estimator gain. In a preferred form of the invention, the gain of the state estimator is calculated by calculating a covariance matrix, $\Sigma$ as the unique, symmetric and at least positive semi-definite solution to the filter algebraic Riccati equation (FARE) in the form of $$\begin{pmatrix} 0 & I \\ 0 & 0 \end{pmatrix} \Sigma + \Sigma \begin{pmatrix} 0 & I \\ 0 & 0 \end{pmatrix}' + \begin{pmatrix} 0 \\ M^{-1} \end{pmatrix} \Xi \begin{pmatrix} 0 \\ M^{-1} \end{pmatrix}' - \Sigma (I \ 0)' \Theta^{-1} (I \ 0) \Sigma = 0,$$

with, where M is the inertia matrix, $\Theta$ is the internal disturbance intensity matrix and $\Xi$ is the external disturbance intensity matrix.

In another preferred form of the invention, the state estimator is a Kalman filter whose gain, H, is calculated from $H = \Sigma(I\ 0)' \Theta^{-1}$. The optimal mount damping parameter, B, and the optimal mount stiffness parameter, K, are derived from $$H = \begin{pmatrix} M^{-1} B \\ M^{-1} K \end{pmatrix}.$$

DETAILED DESCRIPTION OF ILLUSTRATIVE EMBODIMENTS

Although the present invention will be described in connection with magnetic disc drives, the principles of the invention are applicable to optical disc drives, servo track writers and spin stands. Hence, while the present invention will be described in connection with determining optimum damping for a magnetic disc drive, the invention may also be applied to determine optimum damping requirements for servo track writers, spin stands and optical disc drives.

Figure 1:
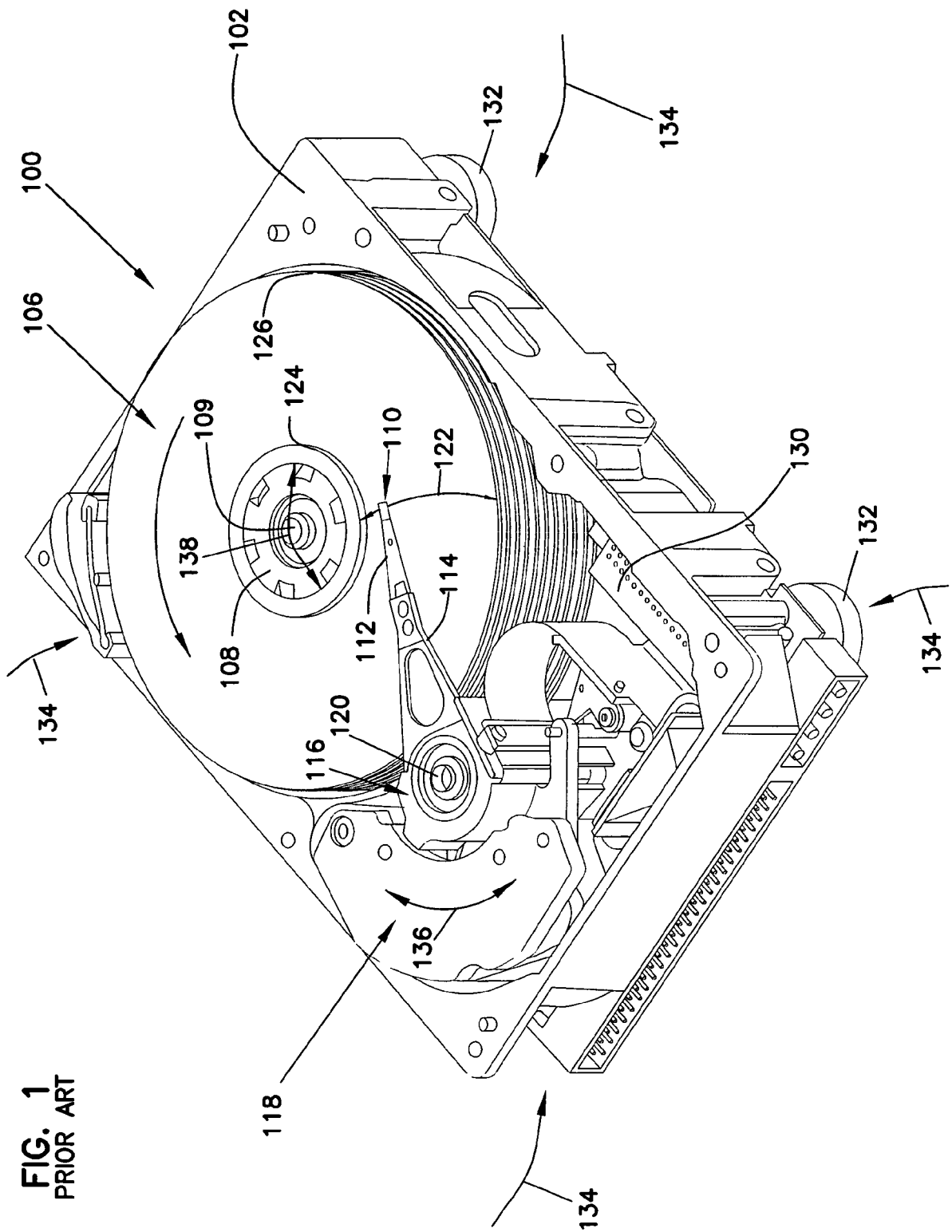
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted spindle 109 for co-rotation about the central axis of the spindle. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor (VCM) 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Passive vibration mounts 132 support base 102 of disc drive 100. Mounts 132 isolate the drive from seismic vibrations, illustrated by arrows 134. As the stiffness of mounts 132 is decreased, better attenuation of the seismic vibrations is obtained. For example, servo track writers and spin stands are often isolated by pneumatic mounts having isolation natural frequencies as low as 2 Hz. Such soft isolation mounts attenuate external vibrations due to seismic disturbances at extremely low frequencies. However, soft isolation mounts cannot attenuate error motions due to internally generated disturbances, such as reaction forces 136 generated by voice coil motor 118 (VCM torque) and reaction forces 138 generated by imbalance of spindle 109. Usually error motions due to these disturbances are attenuated by hard mounts 132. Hence, the external and internal vibration sources have conflicting effects on error motions of the disc drive, such that attenuation of one source by passive mounts leads to amplification of the other source.

Figure 2:
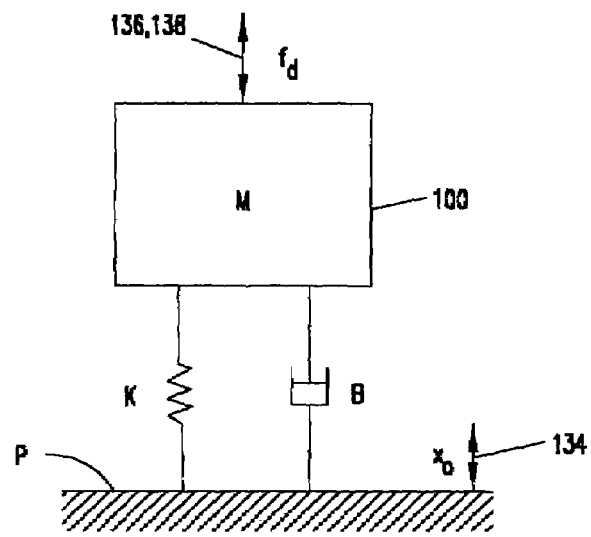
FIG. 2 is a diagram of a spring damping model illustrating the principles of the present invention.

FIG. 2 is a spring damper model illustrating the principles of isolating a mass M, such as disc drive 100. The external disturbances 134 such as seismic motions, collectively represented by $x_0$, are applied to the platform P supporting mass M, and the internal disturbances 136, 138, collectively represented by $f_d$, are acting directly on the mass M. The six-dimensional disturbance force vector $f_d$ models the internal disturbances such as the disc pack imbalance 138 and the VCM torque 136. The six-dimensional external disturbance vector $x_0$ models the seismic vibrations 134 to which the disc drive is subjected. The equations of motion for a rigid body supported by discrete isolators can be written as $$M\ddot{x}+B\dot{x}+Kx=B\dot{x}_0+Kx_0+f_d, \quad (1)$$

where x is the six dimensional vector comprising the six rigid body degrees of freedom, M is the mass/inertia matrix, B is the damping matrix and K is the stiffness matrix, $X_0$ is the six-dimensional vector of external disturbances and $f_d$ is the six-dimensional vector of internal disturbances. Performing Laplace transforms and other algebraic manipulations, the transfer function, $\ddot{X}(s)$, can be represented by $$\ddot{X}(s) = (Ms^2 + Bs + K)^{-1} Ms^2 (M^{-1} F_d(s)) + \quad (2)$$
$$(Ms^2 + Bs + K)^{-1} (Bs + K) \ddot{X}_0(s)$$
$$= P(s)(M^{-1} F_d(s)) + Q(s) \ddot{X}_0(s),$$

where, consistent with feedback control terminology, P(s) is the sensitivity function and Q(s) is the complementary sensitivity function. These transfer function matrices sum up to the identity matrix, I, so $$P(s)+Q(s)=I. \quad (3)$$

Figure 3:
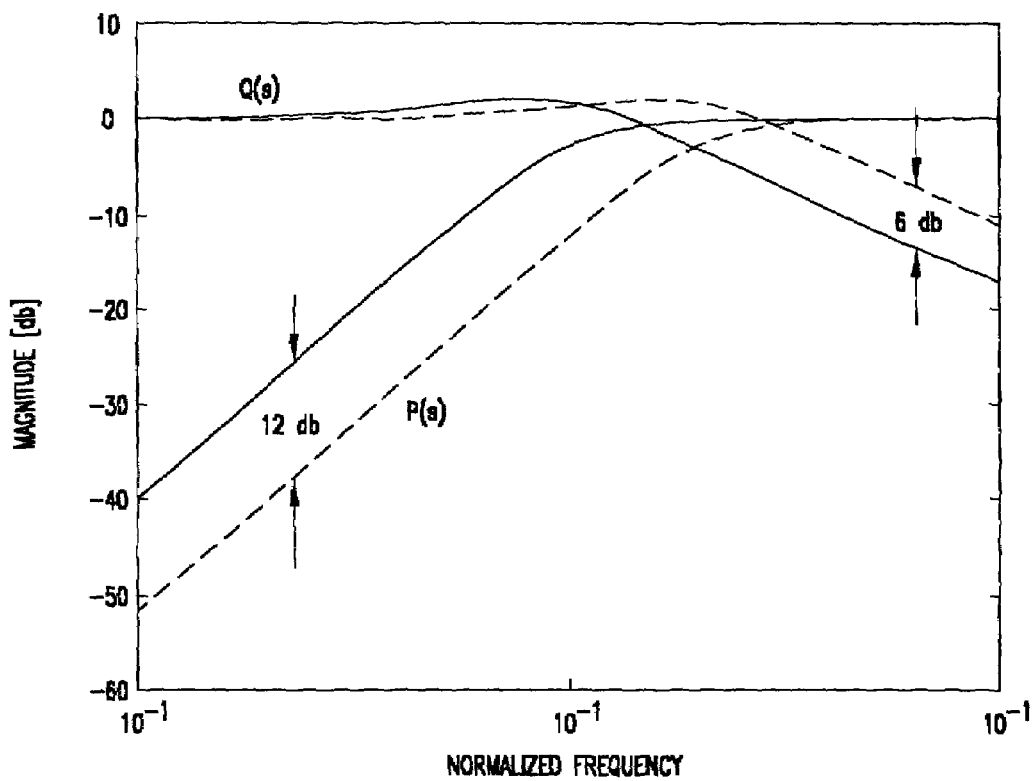
FIG. 3 is a Bode plot illustrating the fundamental tradeoff of passive vibration isolation.

This relationship demonstrates the fundamental tradeoff—it is not possible to have perfect attenuation of both external and internal disturbances. FIG. 3 is a Bode plot of the P(s) and Q(s) transfer functions for a single degree of freedom system and demonstrates that improved attenuation of external disturbances comes at the expense of attenuation of internal disturbances and vice-versa. This is a fundamental tradeoff due to passive vibration isolation. The present invention is directed to a process of optimizing the tradeoff to identify the optimal stiffness and damping of the passive damping mounts.

The present invention employs a state estimator, such as a Kalman filter, which is an optimal state estimator used to minimize the 2-norm of the state estimation error for a system subject to process disturbances and sensor noise. When these disturbance and noise sources act as white noise processes, the Kalman filter provides the optimal solution to the state estimation problem. The present invention addresses the design of the passive mount parameters (i.e., stiffness and damping) as a Kalman filtering problem when the internal and external disturbances can be modeled as white noise processes. The optimal passive mount synthesis for the disc drive is cast into the form of a generic Kalman filtering problem by representing the plant (disc drive 100) as a double integrator in the form $$\begin{Bmatrix} \dot{x}(t) \\ \ddot{x}(t) \end{Bmatrix} = \begin{pmatrix} 0 & I \\ 0 & 0 \end{pmatrix} \begin{Bmatrix} x(t) \\ \dot{x}(t) \end{Bmatrix} + \begin{Bmatrix} 0 \\ M^{-1} \end{Bmatrix} f_d(t) \quad (4)$$

$$y(t) = (I \ 0) \begin{Bmatrix} x(t) \\ \dot{x}(t) \end{Bmatrix} + x_0(t)$$

where M is the inertia matrix of the disc drive mass and both $f_d(t)$ and $x_0(t)$ are assumed to be independent, Gaussian, zero-mean white noise processes. Representing the above equations (4) in the form of a generic Kalman filtering problem, $$\dot{x}(t)=Ax(t)+Lf_d(t),$$

$$y(t)=Cx(t)+x_0(t), \quad (5)$$

with A being the matrix $$\begin{pmatrix} 0 & I \\ 0 & 0 \end{pmatrix},$$

L being the matrix and C being the matrix $$\begin{pmatrix} 0 \\ M^{-1} \end{pmatrix},$$

and C being the matrix (I 0). Thus, the Kalman filter requirements that [A,L] be stabilizable (or controllable) and [A,C] be detectable (or observable) are met.

The covariance of the external disturbances is the product of the external disturbance intensity matrix $\Xi$ and the Dirac delta function $\delta(t-\tau)$, and the covariance of the internal disturbances is the product of the internal disturbance intensity matrix $\Theta$ and the Dirac delta function $\delta(t-\tau)$:

$$E\{f_d(t)f_d'(t)\}=\Xi\partial(t-\tau), \text{ where } \Xi=\Xi'>0$$

$$E\{x_0(t)x_0'(t)\}=\Theta\partial(t-\tau), \text{ where } \Theta=\Theta'>0 \quad (6)$$

In a Kalman filtering problem, the cost functional J, which is the sum of the state estimation error variances $E\{\tilde{x}_i^2(t)\}$, is minimized.

$$J = E \sum_{i=1}^{n} \tilde{x}_i^2(t). \quad (7)$$

Applying the Kalman filtering algorithm to the problem of determining the optimal mount parameters for a disc drive, the error motion state vector (displacement and velocity of the mass of disc drive 100) is minimized.

If $\Sigma$ denotes the stationary covariance matrix of the state motion error, i.e., $\Sigma=E\{\tilde{x}(t)\tilde{x}'(t)\}$, the cost functional J from Equation (7) can be expressed as $J=\text{tr}[\Sigma]$.

The Kalman filter predicts the minimal 2-norm of the state motion error, $\tilde{x}(t)$, for a system subject to external disturbances $x_0$ and internal disturbance $f_d$. The Kalman filter equations are given by $$\hat{a}\hat{c}; \hat{0}\hat{x}\hat{a}\hat{c}\hat{x}; \widetilde{[<a]cx}; \hat{A}\hat{p}(t)=A\hat{x}(t)+H[y(t)-C\hat{x}(t)]$$

$$\hat{y}(t)=C\hat{x}(t), \quad (8)$$

where H is the gain of the Kalman filter $$H=\Sigma C'\Theta^{-1} \quad (9)$$

The covariance matrix $\Sigma$ is obtained as the unique, symmetric, and at least positive semi-definite solution to the filter algebraic Riccati equation (FARE).

$$A\Sigma+\Sigma A'+L\Xi L'-\Sigma C'\Theta^{-1}C\Sigma=0. \quad (10)$$

For the passive mount synthesis problem, the Kalman gain H can be parameterized as $$H = \begin{pmatrix} M^{-1}B \\ M^{-1}K \end{pmatrix}, \quad (11)$$

where B and K are the optimum mount damping and stiffness matrices.

Figure 4:
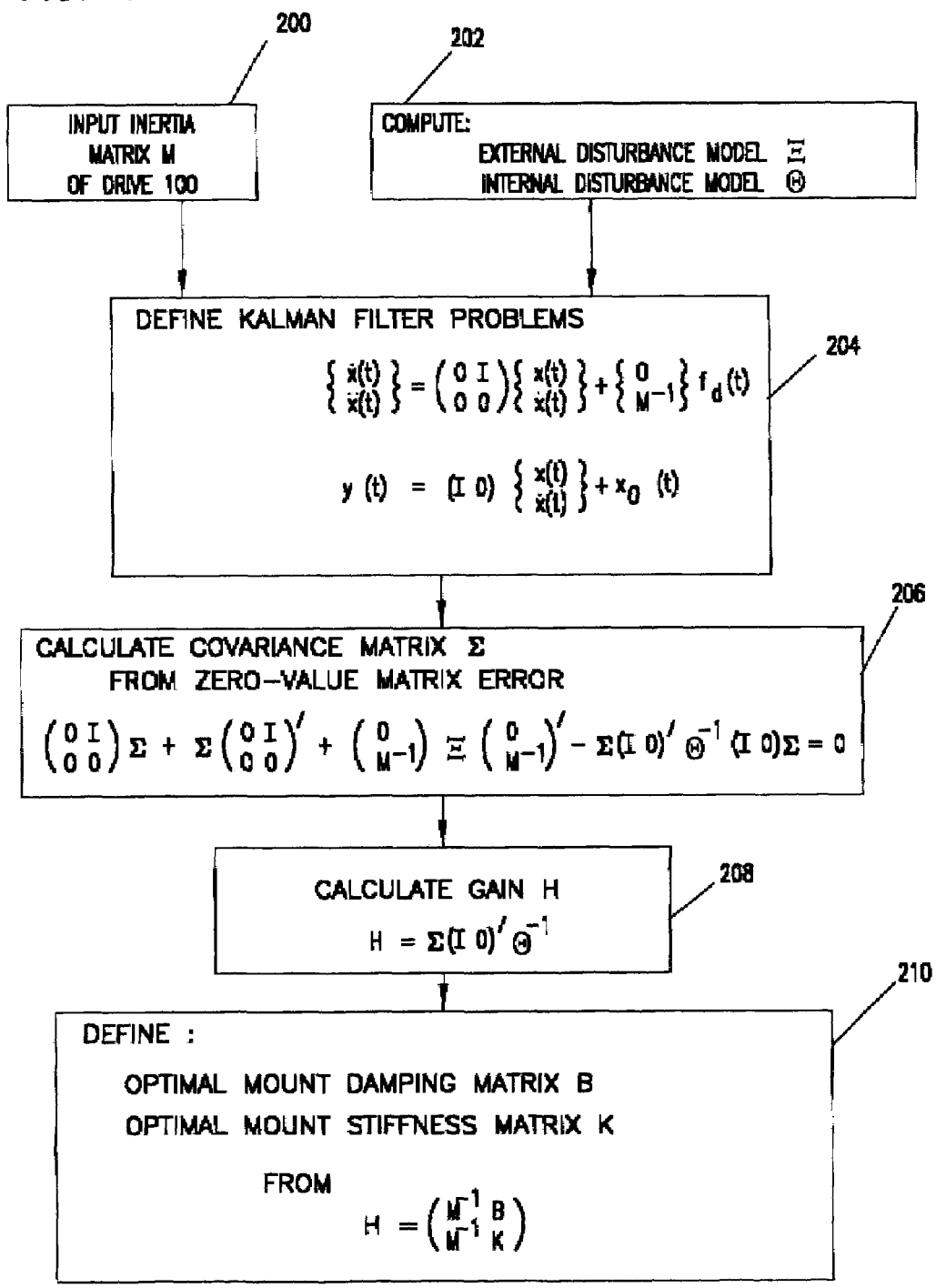
FIG. 4 is a flow diagram illustration the steps taken in identifying an optimal passive mount system for a disc drive.

The process of the present invention is carried out in accordance with the flow diagram of FIG. 4. The inertia matrix M of disc drive 100 is obtained at step 200. At step 202, the internal disturbances $x_0$ are modeled as a white noise process with intensity matrix $\Xi$, and the external disturbances $f_d$ are modeled as an independent white noise process with intensity matrix $\Theta$, where $\Xi$ and $\Theta$ are represented as $\Xi=E\{f_d \cdot f_d'\}$, and $\Theta=E\{x_0 \cdot x_0'\}$.

At step 204, a Kalman filtering problem is defined by the filter equation (4) as $$\begin{Bmatrix} \dot{x}(t) \\ \ddot{x}(t) \end{Bmatrix} = \begin{pmatrix} 0 & I \\ 0 & 0 \end{pmatrix} \begin{Bmatrix} x(t) \\ \dot{x}(t) \end{Bmatrix} + \begin{Bmatrix} 0 \\ M^{-1} \end{Bmatrix} f_d(t) \quad (12)$$

$$y(t) = (I \ 0) \begin{Bmatrix} x(t) \\ \dot{x}(t) \end{Bmatrix} + x_0(t).$$

The covariance matrix $\Sigma$ for the Kalman filter is calculated at step 206 from $$\begin{pmatrix} 0 & I \\ 0 & 0 \end{pmatrix}\Sigma + \Sigma \begin{pmatrix} 0 & I \\ 0 & 0 \end{pmatrix}' + \quad (13)$$

$$\begin{pmatrix} 0 \\ M^{-1} \end{pmatrix} \Xi \begin{pmatrix} 0 \\ M^{-1} \end{pmatrix}' - \Sigma(0 \ I)'\Theta^{-1}(0 \ I)\Sigma = 0.$$

The gain H of the Kalman filter is calculated at step 208 using Equation (9) and the values of $\Sigma$ and $\Theta$ defined at steps 202 and 206, in the form of $H=\Sigma(I \ 0)'\Theta^{-1}$. At step 210, Equation (11) is solved for the values of the mount damping matrix B and stiffness matrix K, thereby defining the optimal vibration isolation mount system for the disc drive.

EXAMPLE

The process of the present invention was applied to a Model x15 Cheetah® 9LP disc drive from Seagate Technology, Inc. The rotational inertia of the disc drive was measured at 2.47 gm-in$^2$. The internal disturbances due to the motion of the voice coil motor and the spindle imbalance were modeled using white noise processes. The external disturbances were approximated using International Standards Organization (ISO) standards for seismic vibrations and other motions of computer equipment.

The internal disturbance due to imbalance of spindle 109 (FIG. 1) corresponds to a single frequency with higher order harmonics and can be modeled directly from drive design and performance. While the motion of voice coil motor 118 excites a broader range of frequencies, for the purposes of the present example only the excitation resulting from voice coil motion is considered. The profile of the torque disturbance generated by the voice coil motor 118 is modeled to be a first-order Markov process given by, $$\tau_{xx}(\omega) = \frac{2\beta\sigma^2}{\omega^2 + \beta^2}. \quad (14)$$

Figure 5:
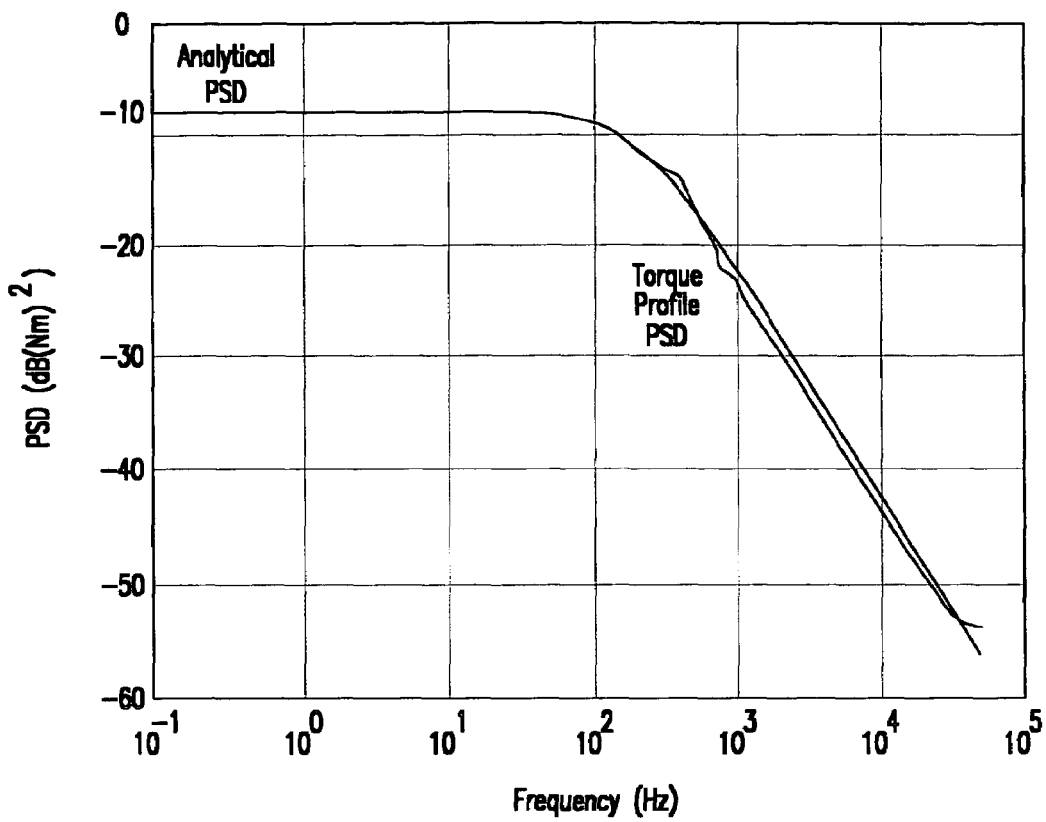
FIGS. 5 and 6 are graphs illustrating the power spectral density of a first-order Markov process representation of the torque of a voice coil motor and of external seismic disturbances, useful in explaining certain aspects of the present invention.

More particularly, the power spectral density (PSD) of the voice coil torque profile during a typical seek is determined and a first-order Markov process closely matching the PSD profile is found. FIG. 5 illustrates this. It was found that the Markov parameters of $\beta=200$ Hz and $\sigma=10$ nm led to a good fit of the PSD of the seek profile.

Figure 6:
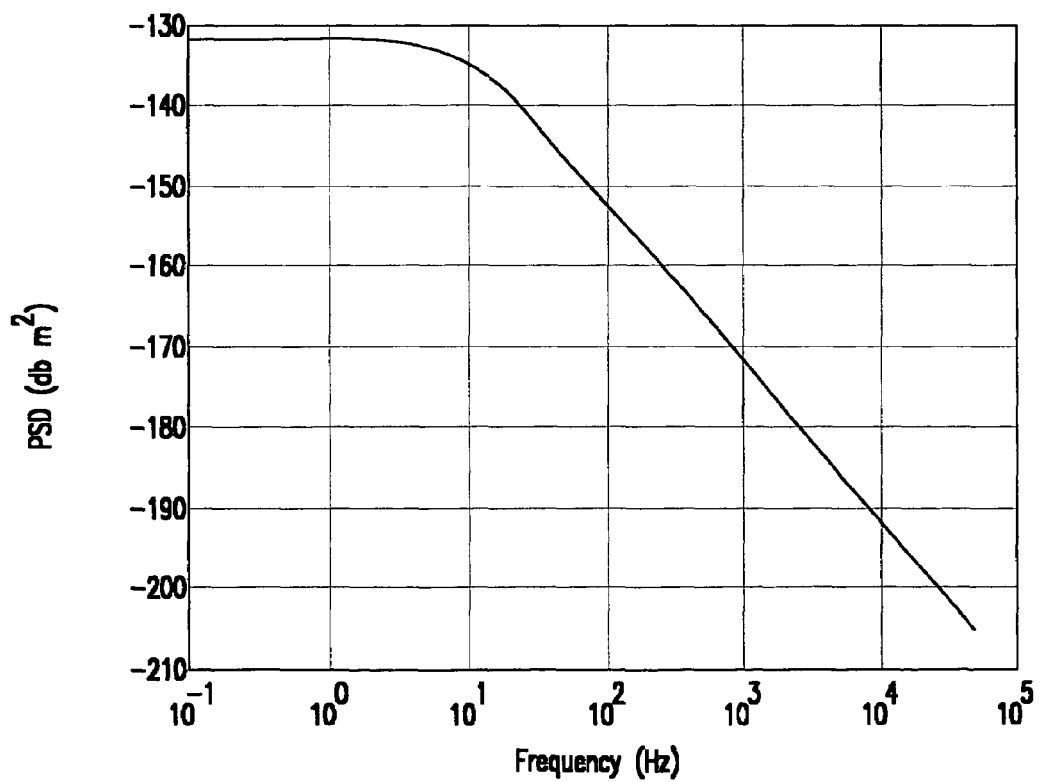

The external disturbances (i.e., seismic vibrations and motions of other components in the chassis) were modeled by approximating the ISO standards for computer equipment. The power spectral density of a first-order Markov process is matched to the power spectral density plot of the external disturbances, as shown in FIG. 6. The Markov parameters $\beta=10$ Hz and $\sigma=1500e-9$ rads were selected to achieve a good fit to the ISO criterion.

For the purposes of this example, the frequency shaping of the power spectral density representation of the voice coil motor torque disturbance and the external vibrations were ignored. In practice, frequency shaping may be considered using shaping filters on the white noise processes in the derivation of the Kalman filter equations, or they may be ignored. Ignoring the frequency shaping of the power spectral density representation for this example does not cause significant loss in accuracy because both have similar frequency profiles (band-limited white noise).

Figure 7:
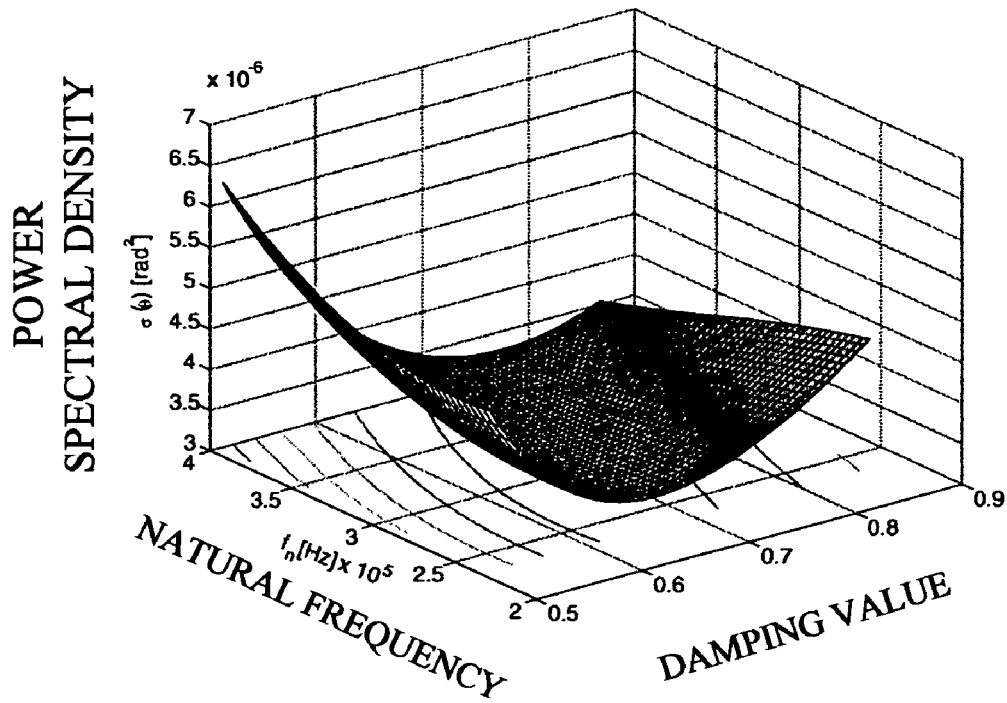
FIGS. 7 and 8 are a surface plot and contour plot, respectively, of disc drive motions as a function of mount parameters, useful in explaining certain aspects of the present invention.
Figure 8:
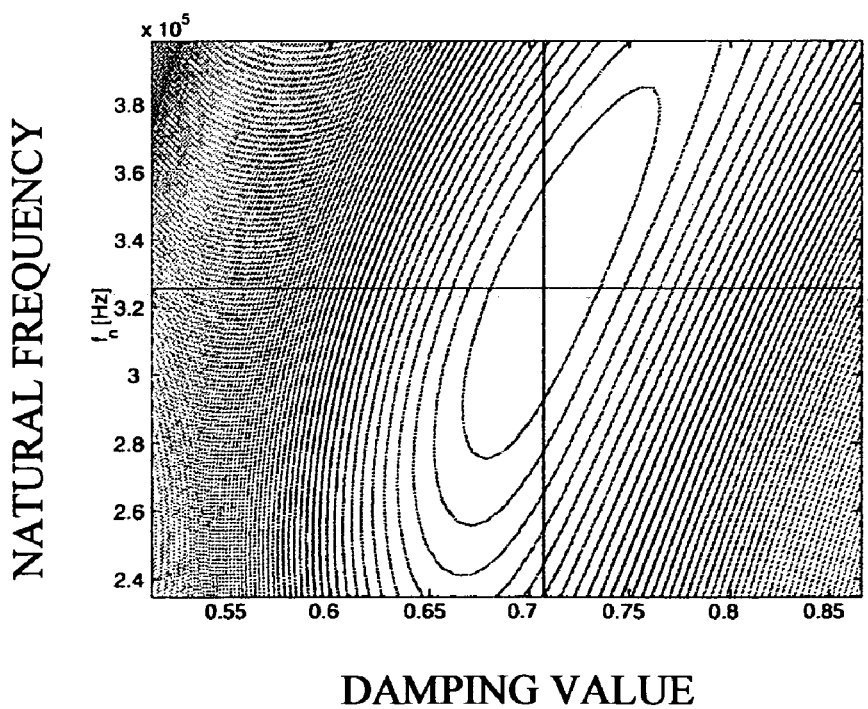

The Kalman gains are computed for the disc drive (step 2086—FIG. 4) and the results are derived in a mass normalized form, i.e., natural frequency and damping of the disc drive in the $\theta_Z$ direction of rotation. FIG. 7 shows a surface plot of the variance of the motions of disc drive 100 in the $\theta_Z$ direction and illustrates the convexity of the optimization problem. FIG. 8 illustrates the contour plot from which the optimum mount parameters can be identified. From FIG. 8, is can be seen that the center of the gradient defines the optimal natural frequency of 325 KHz and the optimal damping of 0.707 ($1/\sqrt{2}$). The optimal damping is especially interesting because it is typical of the Kalman filtering process where the poles lie in a Butterworth pattern in the complex S-plane.

The contour plot of FIG. 8 demonstrates that damping plays a significant role in minimizing the error motions due to rotational vibrations. Disc drives that are rigidly mounted to chassis produce high natural frequencies leading to problems with track registration, while the damping is negligible. The operating point for such a disc drive would be in the upper-left corner of FIG. 8 where the gradient is quite high as evidenced by the close lines in the contour plot. An efficient damping mechanism to achieve the high damping ratios prescribed by the present invention would likely involve nonlinear damping principles such as Coulomb friction.

The present invention thus provides a process of designing an optimal vibration mount 132 for a disc drive 100. At step 202 a model, $\Xi$, is computed of the external disturbances 134 on the disc drive, and a model, $\Sigma$, is computed of internal disturbances 136, 138 in the disc drive. At step 200 an inertia matrix, M, is defined for the disc drive. At step 204, the state estimator is defined based on the inertia matrix, M, and external and internal disturbance matrix models, $\Xi$ and $\Theta$. The state estimator is chosen to minimize 2-norm state estimation error. At step 208, the gain of the state estimator is calculated based on a zero matrix error (step 206). At step 210, the optimal mount damping, B, and stiffness, K, parameters are derived from the calculated gain and inertia matrix.

In preferred embodiments, the gain, H, of the state estimator is derived first by calculating a covariance matrix, $\Sigma$, at step 206 based on a solution to the filter algebraic Riccati equation (FARE)

$$\begin{pmatrix} 0 & I \\ 0 & 0 \end{pmatrix} \Sigma + \Sigma \begin{pmatrix} 0 & I \\ 0 & 0 \end{pmatrix}' + \quad (15)$$

-continued
$$\begin{pmatrix} 0 \\ M^{-1} \end{pmatrix} \Xi \begin{pmatrix} 0 \\ M^{-1} \end{pmatrix}' - \Sigma (0 \ I)' \Theta^{-1} (0 \ I) \Sigma = 0,$$

and at step 208, calculating the state estimator gain based on the covariance matrix $\Sigma$, the external disturbance matrix model $\Xi$, and the internal disturbance matrix model $\Theta$. The optimal mount damping, B, and stiffness, K, parameters are derived at step 210 from the relationship $$H = \begin{pmatrix} M^{-1}B \\ M^{-1}K \end{pmatrix}.$$

In other preferred embodiments the state estimator is a Kalman filter.

Although the present invention has been described with reference to designing the passive vibration isolation mount system for a magnetic disc drive, those skilled in the art will recognize that the present invention may be practiced in other environments where passive vibration isolation mounts systems are required. More particularly, the present invention may be used to design the optimal damping and stiffness parameters of an optical disc drive. Moreover, while the invention has been described in association with a disc drive having a plurality of disc surfaces, the invention may be practiced where only a single disc contributes to the internal disturbances.

It is to be understood that even though numerous characteristics and advantages of various embodiments of the present invention have been set forth in the foregoing description, together with details of the function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the filter algebraic Riccati equation (FARE) herein described can have additional terms for a minimization of a different norm. Other state estimators besides the Kalman filter may be employed for the determination of the optimal mounts, depending on the particular application without departing from the scope and spirit of the present invention. Other modifications can also be made without departing from the scope and spirit of the present invention.

What is claimed is:

1. A process of designing an optimal vibration mount for a disc drive comprising steps of:
   a) computing an external disturbance model for the disc drive;
   b) computing an internal disturbance model for the disc drive;
   c) defining an inertia matrix for the disc drive;
   d) defining a state estimator based on the inertia matrix and external and internal disturbance models to minimize a defined norm of a state estimation error;
   e) calculating the gain of the state estimator as a solution to a filter algebraic Riccati equation; and
   f) defining optimal mount damping and stiffness parameters based on the calculated state estimator gain.

2. The process of claim 1, wherein step (e) includes,
  e1) calculating a covariance matrix based on the solution to the filter algebraic Riccati equation, and
  e2) calculating the state estimator gain based on the covariance matrix.

3. The process of claim 1, wherein step (e) is performed by
  (e1) calculating a covariance matrix $\Sigma$ from a solution of the filter algebraic Riccati equation in the form $$\begin{pmatrix} 0 & I \\ 0 & 0 \end{pmatrix}\Sigma + \Sigma\begin{pmatrix} 0 & I \\ 0 & 0 \end{pmatrix}' + \begin{pmatrix} 0 \\ M^{-1} \end{pmatrix}\Xi\begin{pmatrix} 0 \\ M^{-1} \end{pmatrix}' - \Sigma(0\ I)'\Theta^{-1}(0\ I)\Sigma = 0,$$

where M is the inertia matrix, $\Theta$ is the internal disturbance matrix and $\Xi$ is the external disturbance matrix, and
  (e2) calculating the state estimator gain H from $H=\Sigma(I\ 0)'\Theta^{-1}$.

4. The process of claim 3, wherein step (f) is performed by
  f1) solving $$H = \begin{pmatrix} M^{-1}B \\ M^{-1}K \end{pmatrix}$$

for B and K, and
  f2) setting the optimal mount damping matrix to B and the optimal mount stiffness matrix to K.

5. The process of claim 1 wherein the state estimator is a Kalman filter.

6. The process of claim 5, wherein step e) includes,
  e1) calculating a covariance matrix based on the solution to the filter algebraic Riccati equation, and
  e2) calculating the Kalman filter gain based on the covariance matrix and the inertia matrix.

7. The process of claim 6, wherein step (e) is performed by
  (e1) calculating a covariance matrix $\Sigma$ from a solution of the filter algebraic Riccati equation in the form $$\begin{pmatrix} 0 & I \\ 0 & 0 \end{pmatrix}\Sigma + \Sigma\begin{pmatrix} 0 & I \\ 0 & 0 \end{pmatrix}' + \begin{pmatrix} 0 \\ M^{-1} \end{pmatrix}\Xi\begin{pmatrix} 0 \\ M^{-1} \end{pmatrix}' - \Sigma(0\ I)'\Theta^{-1}(0\ I)\Sigma = 0.$$

where M is the inertia matrix, $\Theta$ is the internal disturbance matrix and $\Xi$ is the external disturbance matrix, and
  (e2) calculating the Kalman filter gain H from $H=\Sigma(I\ 0)'\Theta^{-1}$.

8. The process of claim 7, wherein step (f) is performed by
  f1) solving $$H = \begin{pmatrix} M^{-1}B \\ M^{-1}K \end{pmatrix}$$

for B and K, and
  f2) setting the optimal mount damping matrix to B and the optimal mount stiffness matrix to K.

* * * * *